March 11, 1958 C. W. HANSEN 2,826,031
CONVEYING AND SEPARATING DEVICE FOR A CORN HARVESTER
Filed Jan. 14, 1954 3 Sheets-Sheet 1

INVENTOR:
CHARLES W. HANSEN
BY: Emerson B Donnell
ATTORNEY

March 11, 1958 C. W. HANSEN 2,826,031
CONVEYING AND SEPARATING DEVICE FOR A CORN HARVESTER
Filed Jan. 14, 1954 3 Sheets-Sheet 3

INVENTOR:
CHARLES W. HANSEN
BY: Emerson B Donnell
ATTORNEY

United States Patent Office 2,826,031
Patented Mar. 11, 1958

2,826,031

CONVEYING AND SEPARATING DEVICE FOR A CORN HARVESTER

Charles W. Hansen, Racine, Wis., assignor to J. I. Case Company, Racine, Wis.

Application January 14, 1954, Serial No. 404,047

6 Claims. (Cl. 56—66)

This invention pertains to a corn harvester and, more particularly it pertains to a combined corn chopper and picker.

Corn harvesters of the presently known types are generally constructed to pick corn from the stalks, husk the corn, and then deliver the husked ears to a suitable receptacle. In this process, kernels of corn drop free from the ears and onto a sifting platform where the kernels are gathered while dirt and debris are allowed to pass through. In certain constructions, the kernels are then conveyed to the receptacle containing the ears of corn.

Other well known types of harvesters are constructed to operate along a row of standing corn stalks which are engaged by the harvesters' gathering chains and cut off by the sickle bar. Then the corn stalks are fed bottom first through a harvester base unit to be chopped and deposited back onto the ground or placed into a receptacle such as a wagon.

With the foregoing in mind, it is a primary object of this invention to provide a corn harvester for combined corn chopping, corn picking and the salvaging of loose corn kernels.

Another object of this invention is to provide a corn harvester wherein a single conveyor is used to transport corn stalks to a chopper and to sift the loose corn kernels through to a suitable receptacle.

Still another object is to provide a corn harvester which salvages the shelled corn kernels and places them into a receptacle with the ears of corn.

Another object is to provide a corn harvester which separates the shelled kernels of corn from the stalks, dirt and debris encountered in the corn cropping process. This object is accomplished without providing for a single additional moving part beyond those parts required in the machinery of cropping, picking, conveying, and chopping the corn.

Other objects and advantages will become apparent upon reading the following description in light of the accompanying drawings, in which, Figure 1 is a top plan view of a corn harvester embodying a preferred form of this invention.

Similar reference numerals refer to similar parts throughout the several views.

Figure 1:
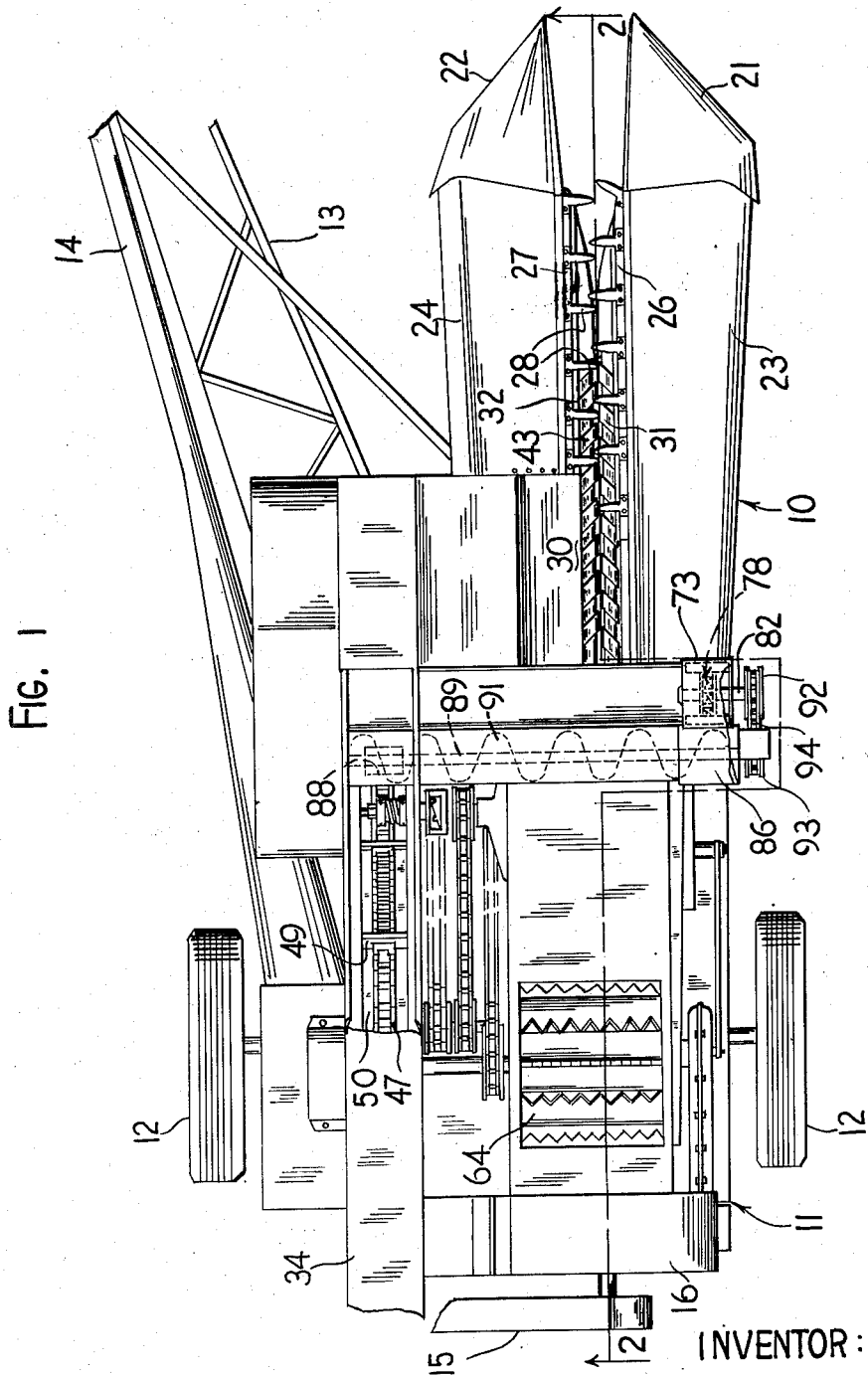

As shown in Figure 1, there is generally provided a corn harvester with a corn chopper unit 10 and, attached to the rear end thereof, a base unit 11. The latter is provided with a pair of wheels 12, while projecting forwardly from that unit is a draw bar 13 which is attachable to a tractor (not shown) to mobilize the harvester.

Also extending forwardly of the base unit 11 is a power take-off shaft not shown and housing 14 which is driven by the tractor to empower the moving parts of the harvester through the conventional pulley drive 15 at the rear of the unit 11. Also mounted on the rear of the base unit 11 is the usual chopper wheel housing 16. It should thus be understood that all the operating parts of the harvester can be powered in this conventional manner.

Since the unit 11 is of a conventional structure, no further description thereof is deemed to be necessary. It should further be understood that the unit is of the conventional type suitable for attaching to crop gathering units such as the unit 10.

Figure 2:
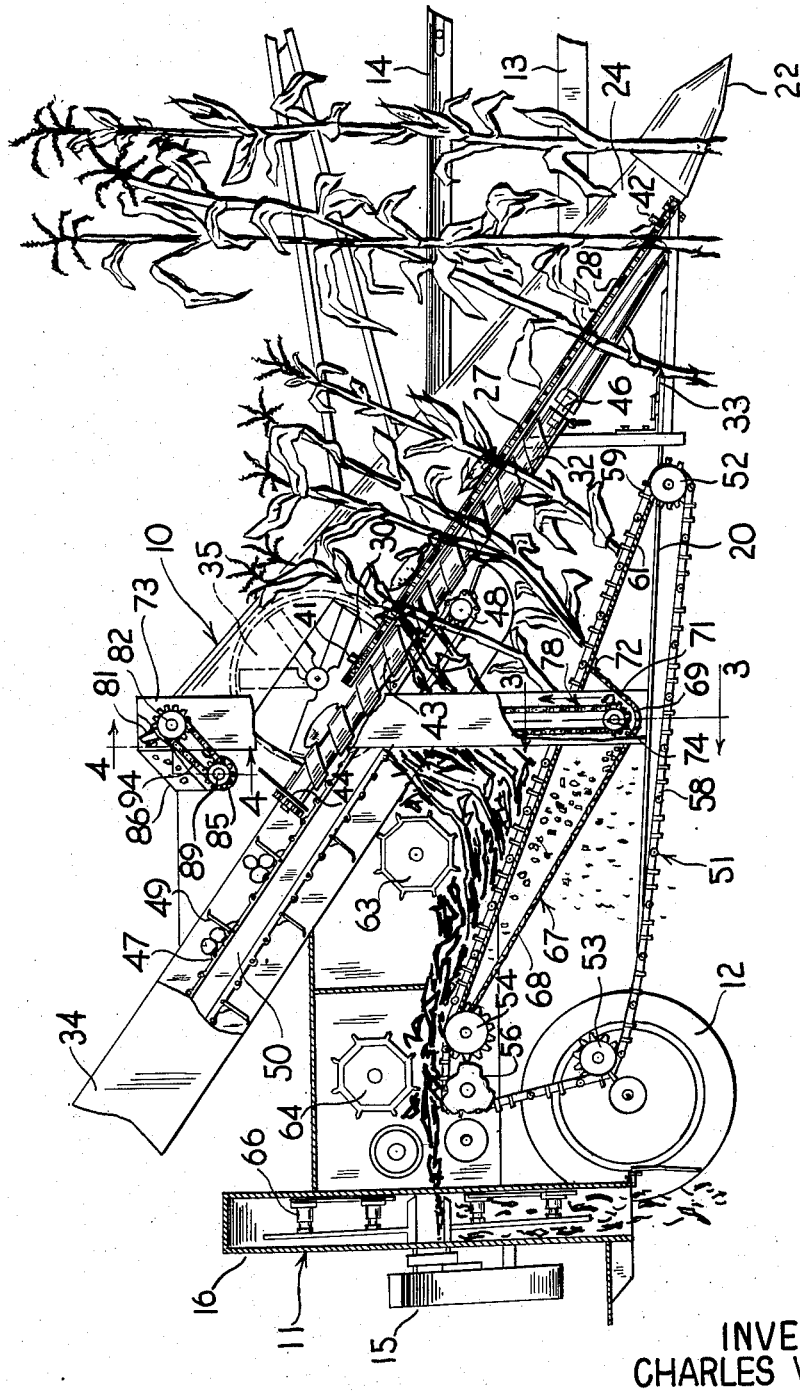
Figure 2 is a fragmentary sectional view with parts broken away taken on the line 2—2 of Figure 1 and showing the harvester at a stage of operation in a row of corn.

The corn cropper unit 10 consists of a frame 20 having a pair of forwardly located and spaced apart gathering points 21 and 22 suitably attached to a pair of rearward stalkway sheets 23 and 24 mounted on the frame 20 whereby the gathering points and the sheets form lateral guides for the corn stalks which are encountered as the harvester advances forward. It should be noted that the sheets are inclined upwardly to the rear. Disposed to extend from the opposed inner surfaces of the sheets 23 and 24 is a pair of endless gathering chains 26 and 27. These chains are oppositely disposed and operate in a plane substantially parallel to the incline of the sheets 23 and 24 as seen in Figure 2.

Referring again to Figure 1, it should be understood that the exposed sections of the gathering chains cooperate in their rearward action to maintain corn stalks therebetween and hold them while the harvester advances forward. To facilitate this, the chains are provided with lugs 28 attached thereto at intervals on the chain to engage the corn stalks. Rotatably mounted immediately below the chains is a pair of corn snapping or picking rolls 31 and 32 which are shown to be in rolling contact at their rearward portions. These rolls are axially rotatable and mounted at an incline corresponding to that of the sheets and the chains and are provided with the usual spiral fluted peripheries. The function of the rolls is trapping the bottom of the corn stalks therebetween and allowing all but the ears of corn to pass through. The ears are snapped off to be carried away by chains 26 and 27 and the rolls 31 and 32. Finally the ears fall off the roll 32 and into a chute 30 which is attached to the side of the harvester adjacent the upper ends of the rolls.

A sickle bar 33 is operably attached at the forward base of the stalkway sheets and therebetween to cut the corn stalks as the harvester moves along. Also attached to the unit 10, to project upwardly and rearwardly therefrom, is an elevator 34 which receives ears and kernels of corn from the unit 10, in a manner hereinafter described, receiving the ears of corn from the chute 30, to deposit the corn in a truck or wagon (not shown). A fan 35 is preferably mounted on the side of unit 10 to blow air over the corn as it passes onto the conveyor 34 and thereby further cleans the corn.

Since the corn cropper unit as described above is generally of a well known type, no further description is deemed to be necessary for an understanding of the structure as seen in Figure 1.

As shown in Figure 2, the harvester is positioned in a row of corn which is sequentially cut, picked, flattened, and chopped to be returned to the ground. To accomplish this the chains 26 and 27 engage the corn stalk and the sickle 33 cuts it. Next the stalk is engaged by the snapping rolls 31 and 32 which remove the ears of corn from the stalk. At this point it should be noted that the chain 27 is operatively mounted on the frame 20 at upper and lower sprocket bearing points 41 and 42 about which the endless chain 27 reverses its direction of travel. Also, the roll 32 is arranged with peripheral spiral flutes 43 and is mounted in upper and lower axial bearings 44 and 46.

Shown mounted on the unit 10 is the corn elevator 34 having a chain conveyor 47 trained about a sprocket 48 suitably rotatably mounted within the unit 10. The conveyor is provided with transversely projecting lugs 49 which receive the corn to carry it upwardly, as shown, from where it was received from the chute 30 and placed onto the conveyor 47. Also, a solid core 50 is preferably provided for the chain conveyor 47 to ride therearound with the core forming a solid floor for the conveyor which can then carry kernels of corn as later described.

Figure 3:
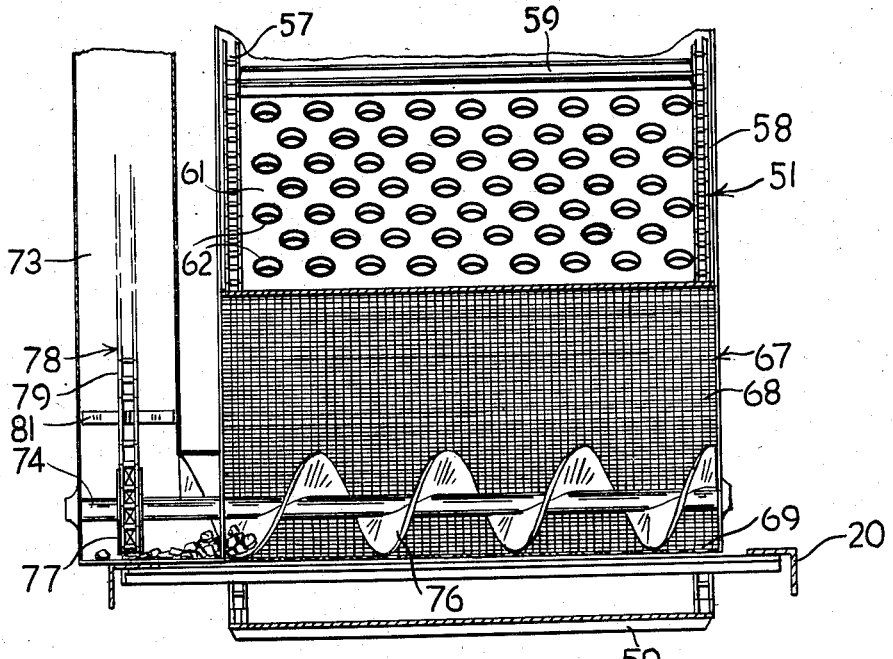
Figure 3 is an enlarged sectional view taken on the line 3—3 of Figure 2.

Mounted on the unit 10 below the gathering chains 26 and 27 and the snapping rolls 31 and 32 is an endless chain conveyor or feed rake 51. A sprocket 52, rotatably mounted at a forward and lower point in the frame 20, locates the forward point of the conveyor 51 which is trained thereabout. Rearwardly located sprockets 53 and 54 guide the travel of the conveyor 51 at its rear section while a lower beater roll 56, about which the conveyor travels, and which is rotatably mounted on the rear end of the frame 20, locates the most rearward point of the conveyor. Here it will be noted that the top section of the conveyor 51 is inclined upwardly to the rear, similar to the incline of the gathering chains and snapping rolls. As shown in Figure 3, conveyor 51 preferably comprises a pair of spaced apart and endless chains 57 and 58 with interconnecting transversely extending channels 59 spaced therealong.

The conveyor 51 is supported on a stationary platform or floor 61 suitably attached to the unit 10 immediately beneath the top section of the conveyor 51. As best shown in Figure 3, the platform 61 is provided with perforations or holes 62, for a purpose hereinafter described. It is preferred that the holes extend through only the upper half of the platform, and also, that perforations 62 be no larger than a kernel of corn. Then, as indicated in the drawing, corn, dirt, and debris will fall through the platform.

After the corn stalks are severed, the cut ends at the bottom engage the conveyor 51 to be carried upwardly therealong as indicated. Rotatably mounted upper beater roll 63 and a second beater roll 64, both suitably mounted within the units 10 and 11, respectively, above the conveyor 51, contact the stalks to press and beat them down onto the conveyor. At approximately this stage of the process the corn stalks have cleared the upper sections of the gathering chains 26 and 27 and are, therefore, free thereof. The stalks finally pass into the base unit 11 where they are cut by a knife wheel 66, located in the housing 16, and the stalks are then blown out and onto the ground.

During this processing of the corn stalks, and particularly when the ears are picked and husked, it should be noted that kernels of corn will fall from the ears. This occurs particularly when the picking rolls 31 and 32 operate as husking rolls, which is usually in the later stage of the movement of the ears up the rolls. At that time the rolls will actually husk the ears leaving the kernels exposed and some then drop from the ears onto the corn stalks traveling below. At this stage, the stalks are so shaken, by the movement of the conveyor 51 and the action of the beater 63, that most of the kernels drop further down to the conveyor 51. Then they are actually sifted through the perforations 62 in the platform 61 as indicated in the drawing. Any kernels which may drop onto the lower half of the platform 61, where no perforations exist, will be carried by the conveyor 51 to the upper half of the platform to be sifted through as described.

Attached below the platform 61 and spaced therefrom to extend under the area provided with the perforations 62, is a stationary screen or sieve 67 which intercepts all that drops through the platform 61.

It should be noted that the screen extends the width of the conveyor 51, as shown in Figure 3. Also, Figure 2 shows that the screen is inclined from the proximity of the axis of the sprocket 54 through a section 68, being formed into a receptacle or trough 69 with a continuous angled section 71 which is preferably attached at 72 to the platform 61. The mesh of the screen is of a size which retains the kernels of corn while permitting the dirt and debris to drop through. Thus, kernels drop onto the screen and slide theredown knocking the dirt through the screen while the kernels gather in the receptacle, as indicated in the drawing.

Attached vertically to the side of the unit 10, as shown in Figure 1, is an elevator housing 73. Within the unit 10, a shaft 74 is rotatably mounted horizontally in a suitable manner. As shown in Figure 3, the shaft is provided with an auger or second conveyor 76 extending along one end thereof while the other end has a sprocket 77 non-rotatably mounted thereon. The sprocket end of the shaft is enclosed by the housing 73 in part forming a continuation of trough 69, and the sprocket is positioned to be slightly spaced from and directly above the trough 69. A chain conveyor type of elevator 78 is trained about the sprocket 77 to extend vertically upwardly therefrom. The elevator 78 preferably consists of an endless chain 79 having buckets 81, or the like, attached to the chain at intervals therealong for a purpose described later.

Rotatably mounted in the upper end of the elevator housing 73 and parallel to the shaft 74 is a second conveyor shaft 82 having a sprocket 83 mounted to be preferably directly above the sprocket 77. To provide power for the elevator 78, either one of the shafts 74 or 82 can be operatively connected to a suitable power drive extending from the base unit 11 or elsewhere in any well known manner of driving parts in a corn harvester. From this arrangement it will be apparent that there is provided a vertical elevator chain conveyor which transports the loose corn kernels from the trough 69 to the top of the elevator housing 73 along the side of the unit 10.

Figure 4:
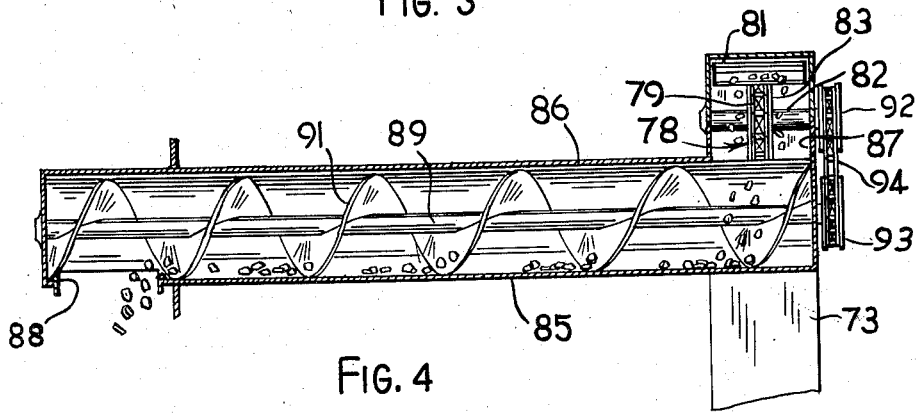
Figure 4 is an enlarged sectional view taken on the line 4—4 of Figure 2.

As further shown in Figures 2 and 4, mounted adjacent the upper portion of housing 73, is a container or casing 86 which has an opening 87 suitable for communicating with housing 73. The container 86 preferably extends horizontally and transversely from the elevator 78 to a point vertically above the elevator 34 where an opening 88 exists in the bottom trough 85 of the container. A shaft 89 is rotatably mounted within the container 86 to extend in a spaced relation across the bottom thereof. Like the shaft 74, the shaft 89 is provided with an auger 91 to operate on the bottom trough 85 of the casing 86.

It should thus be obvious that kernels of corn lifted by the elevator in the buckets 81 are thrown into the container 86 by the movement of the buckets around the sprocket 83. The kernels are then engaged by the auger 91 which is arranged and rotating in a direction suitable to move the kernels to the opening 88 in the container 86. From there the kernels fall onto the corn elevator 34 to be carried off with the ears of corn.

As shown in Figure 1, it is preferred that the shafts 82 and 89 be provided, respectively, with sprockets 92 and 93 and an interengaging drive chain 94. The auger 91 is then driven from the conventional drive means which operates the elevator 78. This drive arrangement also synchronizes the action of the transverse auger 91 with that of the elevator 78.

While a specific embodiment of this invention has been shown and described, the scope thereof should be limited only by the appended claims.

I claim:

1. In a corn harvester of the type having a pair of gathering chains mounted forwardly on said harvester in a rearwardly and upwardly inclined position to engage corn stalks between said chains, a sickle mounted below said gathering chains on said harvester to sever said corn stalks, a pair of corn picking rolls rotatably mounted adjacent said gathering chains, and an ear conveyor supported adjacent said picking rolls, the combination of a conveyor mounted on said harvester below said gathering chains and picker rolls and substantially parallel thereto, a perforated platform stationarily secured on said harvester in supporting relation to said conveyor, chopping mechanism supported rearwardly of said conveyor in position to receive stalks therefrom, a screen of a mesh suitable to retain kernels of corn and mounted on said harvester below said platform, said screen having a trough portion and a second conveyor mounted on said harvester in communication between said screen trough and said ear conveyor for conveying shelled corn gathered in said screen to said ear conveyor.

2. In a corn harvester of the type having a pair of spaced gathering chains mounted forwardly on the harvester in an upwardly and rearwardly inclined position to engage corn stalks therebetween, a sickle mounted below said gathering chains on said harvester to sever corn stalks engaged by said chains, a pair of snapping rolls mounted on said harvester below said gathering chains, an ear elevator disposed adjacent said snapping rolls and chopping mechanism disposed rearwardly of said snapping rolls, the combination of an upwardly and rearwardly inclined platform on the harvester beneath the snapping rolls leading toward said chopping mechanism and in position to engage the butts of stalks severed by said sickle, a conveyor on said platform and movable to transport said stalks, in conjunction with said gathering chains toward said chopping mechanism, said platform having a perforated portion positioned to pass therethrough shelled corn falling from said snapping rolls, a screen of a mesh suitable to retain kernels of corn and pass smaller particles, said screen including a trough portion and being supported beneath the perforated portion of said platform, and conveying means in said trough portion arranged to transport material accumulating in said trough portion to said ear elevator.

3. In a corn harvester of the type having a gathering chain mounted forwardly on the harvester in an upwardly and rearwardly inclined position to engage corn stalks therebetween, a sickle mounted below said gathering chain on said harvester to sever corn stalks engaged by said chain, a pair of snapping rolls mounted on said harvester below said gathering chain, an ear conveyor disposed adjacent said snapping rolls and chopping mechanism disposed rearwardly of said snapping rolls, the combination of an upwardly and rearwardly inclined platform on the harvester beneath the snapping rolls leading toward said chopping mechanism and in position to engage the butts of stalks severed by said sickle, a conveyor on said platform and movable to transport said stalks in conjunction with said gathering chain toward said chopping mechanism, said platform having a perforated portion positioned to pass therethrough shelled corn falling from said snapping rolls, means including a trough portion, supported beneath the perforated portion of said platform, and conveying means in said trough portion arranged to transport material accumulating in said trough portion to said ear elevator.

4. In a corn harvester of the type having a sickle, a pair of snapping rolls mounted on said harvester above said sickle, the combination of an upwardly and rearwardly inclined platform on the harvester beneath the snapping rolls in position to engage the butts of stalks severed by said sickle, a conveyor on said platform and movable to transport said butts generally in the direction of said platform, chopping mechanism disposed rearwardly of said platform, said platform having a perforated portion positioned to pass therethrough shelled corn falling from said snapping rolls, means including a trough portion, supported beneath the perforated portion of said platform, and conveying means in said trough portion arranged to transport material accumulating in said trough portion to a point of disposition.

5. A conveying and separating device for a corn harvester comprising an upwardly inclined perforated platform, a raddle type conveyor moving upwardly along the perforated platform and positioned to receive the butt ends of corn stalks severed from the ground and being treated by the machine and also to receive kernels of corn inadvertently shelled from ears being severed from said corn stalks, an inclined screen supported beneath said perforated platform in position to receive kernels falling through the perforations and of a mesh sufficiently close to prevent passage of kernels therethrough, said screen providing a trough-like portion at its lowest point wherein said kernels will accumulate by gravity, an auger type conveyor disposed within said trough-like portion, and means for rotating said conveyor to propel accumulating kernels along said trough-like portion to a point of recovery.

6. A conveying and separating device for a corn harvester comprising an upwardly inclined perforated platform, a raddle type conveyor moving upwardly along the perforated platform and positioned to receive the butt ends of corn stalks severed from the ground and being treated by the machine and also to receive kernels of corn inadvertently shelled from ears being severed from said corn stalks, an inclined screen supported beneath said perforated platform in position to receive kernels falling through the perforations and of a mesh sufficiently close to prevent passage of kernels therethrough, said screen providing a collecting portion at its lowest point wherein said kernels will accumulate by gravity, a conveyor disposed in cooperating relation to said collecting portion, and means for actuating said conveyor to propel accumulating kernels from said collecting portion and to a point of recovery.

References Cited in the file of this patent
UNITED STATES PATENTS

| | | |
|---|---|---|
| 784,907 | Welsh | Mar. 14, 1905 |
| 1,722,717 | Trottman | July 30, 1929 |
| 1,984,895 | Rosenthal et al. | Dec. 18, 1934 |
| 2,293,757 | Jochumsen | Aug. 25, 1942 |
| 2,333,901 | Swenson | Nov. 9, 1943 |
| 2,385,193 | Burgin | Sept. 18, 1945 |
| 2,658,319 | Hansen | Nov. 10, 1953 |
| 2,661,586 | Krause et al. | Dec. 8, 1953 |